United States Patent Office 3,468,876
Patented Sept. 23, 1969

---

3,468,876
POLYMETHYLENE THIURAM SULFIDES
John J. D'Amico, Dunbar, W. Va., assignor to Monsanto Company, St. Louis, Mo., a corporation of Delaware
No Drawing. Filed Jan. 6, 1966, Ser. No. 518,983
Int. Cl. C07d 41/00; A01n 9/22; C08g 51/48
U.S. Cl. 260—239                                      5 Claims

ABSTRACT OF THE DISCLOSURE

Polymethylene thiuram sulfides of the formula

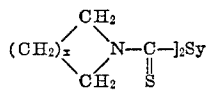

where $x$ is 5 or 6, and $y$ is 1 to 4, are useful as vulcanization accelerators and inhibitors of fungi.

---

This invention relates to polymethylene thiuram sulfides. These compounds may be represented by the formula

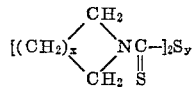

where $x$ is 5 or 6 and $y$ is 1 to 4.

Bis(hexahydro-1-azepinylthiocarbonyl) mono and disulfides have been known since 1941. They were described by Ira Williams and named dihexamethylene thiuram disulfide and dihexamethylene thiuram monosulfide, respectively, U.S. Patent 2,236,389. The polymethylene thiuram sulfides accelerate the vulcanization of rubber. It has now been found that the compounds in which $x$ is 5 or 6 impart considerably more processing safety to a vulcanizable rubber composition than the polymethylene thiuram sulfides heretofore known.

The preparation of the compounds is illustrated by the following examples.

Example 1

To a stirred charge containing 67.9 grams (0.6 mole) of heptamethylenimine, 96 grams (0.6 mole) of 25% sodium hydroxide and 500 ml. of water was added dropwise, at 5–15° C., 45.6 grams (0.6 mole) of carbon disulfide and stirring continued at 25–30° C. for an hour. The mixture was then cooled at 0° C. whereupon there was added dropwise at 0–10° C. in one hour, 75.4 grams (0.33 mole) of ammonium persulfate dissolved in 300 ml. of water. After stirring at 0.–10° C. for 30 minutes, the precipitate was collected by filtration, washed with water until neutral and air-dried at 45° C. Bis(hexahydro-1(2H)-azocinylthiocarbonyl)disulfide was obtained in 98% yield. After recrystallization from ethyl acetate, the cream solid melted at 140–141° C. Analysis gave 7.31% nitrogen and 34.11% sulfur compared to 7.44% nitrogen and 34.05% sulfur calculated for $C_{16}H_{28}N_2S_4$.

Example 2

Following the procedure of Example 1, 76.3 grams (0.6 mole) of octamethylenimine in 1200 ml. of water was substituted for heptamethylenimine. Bis(octahydro-1H-azonin-1-ylthiocarbonyl)disulfide was obtained in 98% yield. After recrystallization from an alcohol-benzene mixture, the off-white solid melted at 157°–158° C. Analysis gave 6.90% nitrogen and 31.88% sulfur compared to 6.92% nitrogen and 31.69% sulfur calculated for $C_{18}H_{32}N_2S_4$.

The products of the present invention were tested to determine their effectiveness as rubber vulcanization accelerators in the following tire tread stock:

|  | Parts by weight | |
|---|---|---|
| Stock | A | B |
| Smoked sheets rubber | 100 | 100 |
| Carbon black | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| Bis(hexahydro-1(2H)-azocinylthiocarbonyl disulfide | 0.5 | |
| Bis(octahydro-1H-azonin-1-ylthiocarbonyl disulfide |  | 0.5 |

The stocks were cured in the usual manner by heating in a press for various periods of time at 144° C. The physical properties of the optimum cures are recorded:

TABLE I

| Stock | Modulus of elasticity in lbs./in.² at 300% elongation | Tensile at break in lbs./in.² | Ultimate elongation, percent |
|---|---|---|---|
| A | 2,250 | 3,300 | 420 |
| B | 2,250 | 3,200 | 410 |

The processing safety of the stocks was evaluated by heating in a Mooney plastometer. The time in minutes required for the plasticity to increase 5 points above the minimum was determined. These values are a measure of processing safety, higher times indicating greater processing safety. The results are recorded below:

TABLE II

Stock:                Mooney scorch time at 121° C.
A ----------------------------------------- 13.6
B ----------------------------------------- 15.7

The Mooney scorch of a similar stock containing as the accelerator 0.5 part of bis(hexahydro-1H-azepin-1-ylthiocarbonyl) disulfide was 11.3 minutes. The stock containing the bis(hexahydro-1H-azepin-1-ylthiocarbonyl) disulfide developed an ultimate tensile strength of 2900 pounds per square inch at optimum cure under the same condition.

To demonstrate the efficiency of the compounds as vulcanizing agents, tests were carried out employing the compounds on an equimolar basis. Stocks were compounded comprising:

|  | Parts by weight | | |
|---|---|---|---|
| Stock | C | D | E |
| Smoked sheets rubber | 100 | 100 | 100 |
| Carbon black | 50 | 50 | 50 |
| Zinc oxide | 5 | 5 | 5 |
| Stearic acid | 3 | 3 | 3 |
| Saturated hydrocarbon softener | 3 | 3 | 3 |
| Bis(hexahydro-1(2H)-azocinylthiocarbonyl)disulfide | 4.52 |  |  |
| Bis(octahydro-1H-azonin-1-ylthiocarbonyl) disulfide |  | 4.86 |  |
| Bis(hexahydro-1H-azepin-1-ylthiocarbonyl) disulfide |  |  | 4.18 |

The stocks were vulcanized by heating for different periods of time in the usual manner in a press at 144° C. The modulus and tensile properties of the 40-minute cures and resistance of the unvulcanized compositions to scorch are recorded below:

TABLE III

| Stock | Modulus of elasticity in lbs./in.² at 300% elongation | Tensile at break in lbs./in.² | Mooney scorch at 121° C. |
|---|---|---|---|
| C | 2,300 | 3,400 | 11.1 |
| D | 2,200 | 3,300 | 11.9 |
| E | 2,170 | 2,700 | 10.9 |

Example 3

A slurry was prepared by mixing 37.6 grams (0.1 mole) of bis(hexahydro-1(2H)-azocinylthiocarbonyl) disulfide prepared as described in Example 1, 7.4 grams (0.11 mole) of potassium cyanide, and 500 ml. of methanol. After heating the slurry at refluxing temperature fror 5 hours, it was cooled to 30° C. and 500 ml. of water added. The reaction mixture was then agitated at 25°–30° C. for 18 hours whereupon the precipitate was collected by filtration, washed with water until the washings were neutral to litmus, and air-dried at 25°–30° C. Bis(hexahydro-1(2H)-azocinylthiocarbonyl) sulfide was obtained in 75.5% yield as a brown solid. After recrystallization from alcohol, it melted at 98°–99° C. Analysis gave 8.22% nitrogen and 27.90% sulfur compared to 8.13% nitrogen and 27.92% sulfur calculated for $C_{16}H_{28}N_2S_3$.

Example 4

Substituting 40.5 grams (0.1 mole) of the disulfide as prepared in Example 2 in the procedure of Example 3, bis(octahydro-1H-azoin-1-ylthiocarbonyl)sulfide was obtained in 86.5% yield as a dark tan solid. After recrystallization from alcohol, it melted at 130°–131° C. Analysis gave 7.54% nitrogen and 25.83% sulfur compared to 7.52% nitrogen and 25.81% sulfur calculated for $C_{18}H_{32}N_2S_3$.

The products of Examples 3 and 4 were tested as rubber vulcanization accelerators in a tire tread stock. Stocks were compounded comprising:

| Stock | Parts by weight | |
|---|---|---|
| | F. | G |
| Smoked sheets rubber | 100 | 100 |
| Carbon black | 50 | 50 |
| Zinc oxide | 5 | 5 |
| Stearic acid | 3 | 3 |
| Saturated hydrocarbon softener | 3 | 3 |
| Sulfur | 2.5 | 2.5 |
| Bis(hexahydro-1(2H)-azocinylthiocarbonyl) sulfide | 0.5 | |
| Bis(octahydro-1H-azonin-1-ylthiocarbonyl) sulfide | | 0.5 |

The stocks were cured in the usual manner by heating in a press for various periods of time at 144° C. The physical properties of the optimum cures are recorded:

TABLE IV

| Stock | Modulus | Tensile | Elongation |
|---|---|---|---|
| F | 2,290 | 3,200 | 410 |
| G | 2,150 | 3,100 | 420 |

The processing safety of the stocks was evaluated by heating in a Mooney plastometer. The time in minutes required for the plasticity to increase 5 points above the minimum was determined. The results are recorded below:

TABLE V

| Stock: | Mooney scorch at 121° C. |
|---|---|
| F | 26.3 |
| G | 27.3 |

The Mooney scorch times of a similar stock containing as accelerator 0.5 part of bis(hexahydro-1H-azepin-1-yl-thiocarbonyl)sulfide was 22.7 minutes.

Although smoked sheet rubber has been selected as illustrative, rubbers in which the products of the present invention are useful include both natural rubber and synthetic rubber. Rubber includes sulfur-vulcanizable diene polymers, preferably those containing a major proportion of diene polymer. Hydrocarbon diene rubbers are preferred but also useful are copolymers of diene hydrocarbons and acrylonitrile. Furthermore isobutylene copolymerized with a small amount of diene (Butyl rubber) can be used in practice of the invention. Isoprene or butadiene-1,3 copolymers with vinyl monomers copolymerizable therewith, as for example styrene, are illustrative of the preferred diene rubbers. The amount of thiuram sulfide added to the rubber will vary widely depending upon the purpose of the compounder. In general, the amounts will fall within the range of 0.1 to 10 parts by weight per hundred parts by weight of rubber.

The foregoing data show that the compounds of this invention possess stronger accelerating and vulcanizing properties and impart greater processing safety as compared to polymethylene thiuram sulfides heretofore known.

Bis(hexahydro-1-(2H)-azocinylthiocarbonyl) disulfide is useful to inhibit the germination of the common plant fungal pathogen *Venturia inaequalis*, the causative organism of apple scab. Fungicidal activity was demonstrated by spore germination tests on glass slides. In this procedure the experimental compound was formulated as at 10 p.p.m. aqueous solution. One drop of this solution was placed in a well of a concavity glass slide and two drops of a conidial suspension of *Venturia inaequalis* (adjusted to 625,000 per ml.) were added. The slides were then placed into a Petri plate, water added to the plate to provide humidity, and the plate covered with a lid. After 24 hours the cover was removed, the slides examined, and the observations recorded. No germination—i.e., complete control of the organism—was observed. When applied to apple foliage which had been inoculated with the pathogen, bis(hexahydro-1(2H)-azocinylthiocarbonyl)disulfide performed equal to or better than a commercial control.

It is intended to cover all changes and modifications of the examples of the invention herein chosen for purposes of disclosure which do not constitute departures from the spirit and scope of the invention.

What is claimed is:
1. A compound of the formula

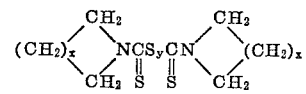

where $x$ is an integer at least 5 but less than 7 and $y$ is an integer at least 1 but less than 5.

2. A compound of claim 1 where $x$ is 5 and $y$ is 2.
3. A compound of claim 1 where $x$ is 6 and $y$ is 2.
4. A compound of claim 1 where $x$ is 5 and $y$ is 1.
5. A compound of claim 1 where $x$ is 6 and $y$ is 1.

References Cited
UNITED STATES PATENTS

| 2,187,719 | 1/1940 | Williams | 260—239 |
| 2,236,389 | 3/1941 | Williams | 260—239 |

ALTON D. ROLLINS, Primary Examiner

U.S. Cl. X.R.

260—79.5, 784; 424—244